United States Patent [19]

Bergomi et al.

[11] 3,763,912

[45] Oct. 9, 1973

[54] BREAKER STRUCTURE INCLUDING GLASS FIBERS FOR RADIAL TIRES

[75] Inventors: Luciano Bergomi; Cinisello Balsamo, both of Milan, Italy

[73] Assignee: Industrie Pirelli S.p.A., Milan, Italy

[22] Filed: July 7, 1971

[21] Appl. No.: 160,491

[30] Foreign Application Priority Data
July 10, 1970  Italy............................ 27.242 A/70

[52] U.S. Cl............................ 152/361 DM, 152/357
[51] Int. Cl................................................. B60c 9/18
[58] Field of Search............................ 152/361, 357

[56] References Cited
UNITED STATES PATENTS
3,095,026  6/1963  Weber.......................... 152/361 X
3,570,573  3/1971  Marker.......................... 152/361 X Primary Examiner—Gerald M. Forlenza
Assistant Examiner—George H. Libman
Attorney—Stevens, Davis, Miller & Mosher

[57] ABSTRACT

A pneumatic tire for vehicles which comprises a radial carcass and a breaker structure which is formed by at least two superimposed layers of cord fabric in which the cords are parallel to one another in each layer but are inclined with respect to the mid-circumferential plane of the tire in such a way that the direction of the cords in one layer crosses with the direction of the cords of the adjacent layer and an additional layer comprising a compound incorporating elongated particles of a material having a high modulus of elasticity but being resistant to compression, the longitudinal axes of the particles being oriented at an angle with respect to the mid-circumferential plane of the tire which is ranging between 60° and 90°.

3 Claims, 4 Drawing Figures

INVENTOR
LUCIANO BERGOMI

INVENTOR
LUCIANO BERGOMI

BREAKER STRUCTURE INCLUDING GLASS FIBERS FOR RADIAL TIRES

The present invention refers to pneumatic tires provided with a radial carcass, and more precisely it concerns the breaker structures of such tires.

It is known that the breaker structure has a critical influence on the tire behavior. The materials constituting said structure and the angular relationship of its cords are among the most important factors which define the safety features of a tire.

The ever-increasing stresses to which the tires are nowadays subjected have led to the adoption of more and more rigid breaker structures for tires which increase in particular the features of road holding and steering safety. Such breaker structures correspondingly reduce the degree of comfort and originate a degradation in the endurance or tire life. This latter is due for the most part to irregular localized wear of the tread, in particular in its lateral portions. Several solutions have been proposed to increase the degree of comfort provided by the tire and to eliminate localized wear in the tread.

One solution provides a breaker structure which comprises at least two layers of textile material superimposed on the tire carcass, one over the other, whose cords are parallel to one another in each layer but which are inclined, in opposite directions to each other with respect to the mid-circumferential plane of the tire at angles ranging between 10° and 30°.

Another solution provides for the insertion, between two layers of textile material, whose cords are inclined with respect to the mid-circumferential plane at an angle ranging between 10° and 30° in one direction, of at least one strip of metal cords which are inclined with respect to the mid-circumferential plane at an angle ranging between 13° and 33° in the direction opposite to the cords of the textile material layers, said angle being greater by at least 2° than the angles formed by the cords of said textile material layers.

One or more textile strips can be folded along the edges of the breaker structure in order to impart a greater stiffness to the tread corners.

Both of the above indicated solutions provide moreover an additional layer of metallic material, or of another material resistant to compression, which is arranged in a radially outer position and whose cords form, with the mid-circumferential plane of the tire, an angle ranging between 60° and 90°.

The application of such solutions has given very good results. The present invention, however, provides a further improvement to the already obtained advantages, in particular, an increase in the degree of comfort and raising the fatigue resistance point of the structure.

The present invention provides a pneumatic tire which possesses very good characteristics of road holding, steering safety and comfort, is not subject to irregular wear of the tread and has improved resistance to fatigue failure.

The present invention is a pneumatic tire for vehicles which comprises a radial carcass and a breaker structure formed by at least two superimposed layers of cord fabric, said cords being parallel to one another in each layer but are inclined with respect to the mid-circumferential plane in such a way that the direction of the cords in one layer crosses with the direction of the cords of the adjacent layer, the value of the angles formed by the cords of the various layers with the mid-circumferential plane of the tire ranging between 10° and 33° and, in a radially outer position with reference to the layers of cord fabric, an additional layer of a compound incorporating particles of elongated shape of a material having a modulus of elasticity of at least 5,000 kg/mm² and resistant to compression, the longitudinal axes of said particles being oriented at an angle ranging between 60° and 90° with respect to the mid-circumferential plane of the tire.

The particles in the additional layer could be advantageously constituted by a reinforcing element such as that described in copending U.S. application Ser. No. 129,613 filed Mar. 30, 1971 by the present Applicant and now abandoned. According to another embodiment, the particles in the radially outer additional layer comprise, as indicated in the aforementioned copending application, particles of glass fibers having a length ranging between 0.1 mm and 1 mm and a diameter comprised between 2 and 20 microns, and present in a percentage by weight ranging between 3 percent and 20 percent on the total weight of the compound of said additional layers.

According to a preferred embodiment of the present invention, the longitudinal axis of the particles is oriented at an angle ranging between 75° and 85° with respect of the mid-circumferential plane of the tire.

The width of the additional layer corresponds substantially to the width of the tread, in order to constitute a solid support for the blocks of the tread pattern, which will as a result be stiffer at their contact with the ground, and therefore less liable to creep on it, with a remarkable advantage on the uniformity of the wear of the tread. The improvements in characteristics of fatigue resistance and in the degree of comfort are due to the fact that the above described additional layer is more resilient under tension than a layer constituted by metallic cords, although such a layer has substantially the same rigidity to compression as metallic cords in the transverse direction of the tire, which ensures good road holding characteristics in the latter.

The present invention will be better understood on the basis of the attached drawings in which, by way of illustrative example:

Figure 1:
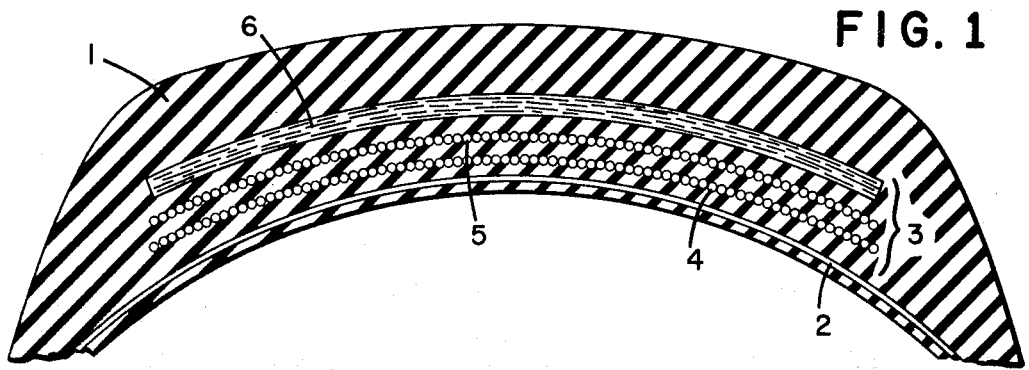
FIG. 1 represents diagrammatically in cross-section the tread portion of a pneumatic tire according to one embodiment of the invention.
Figure 2:
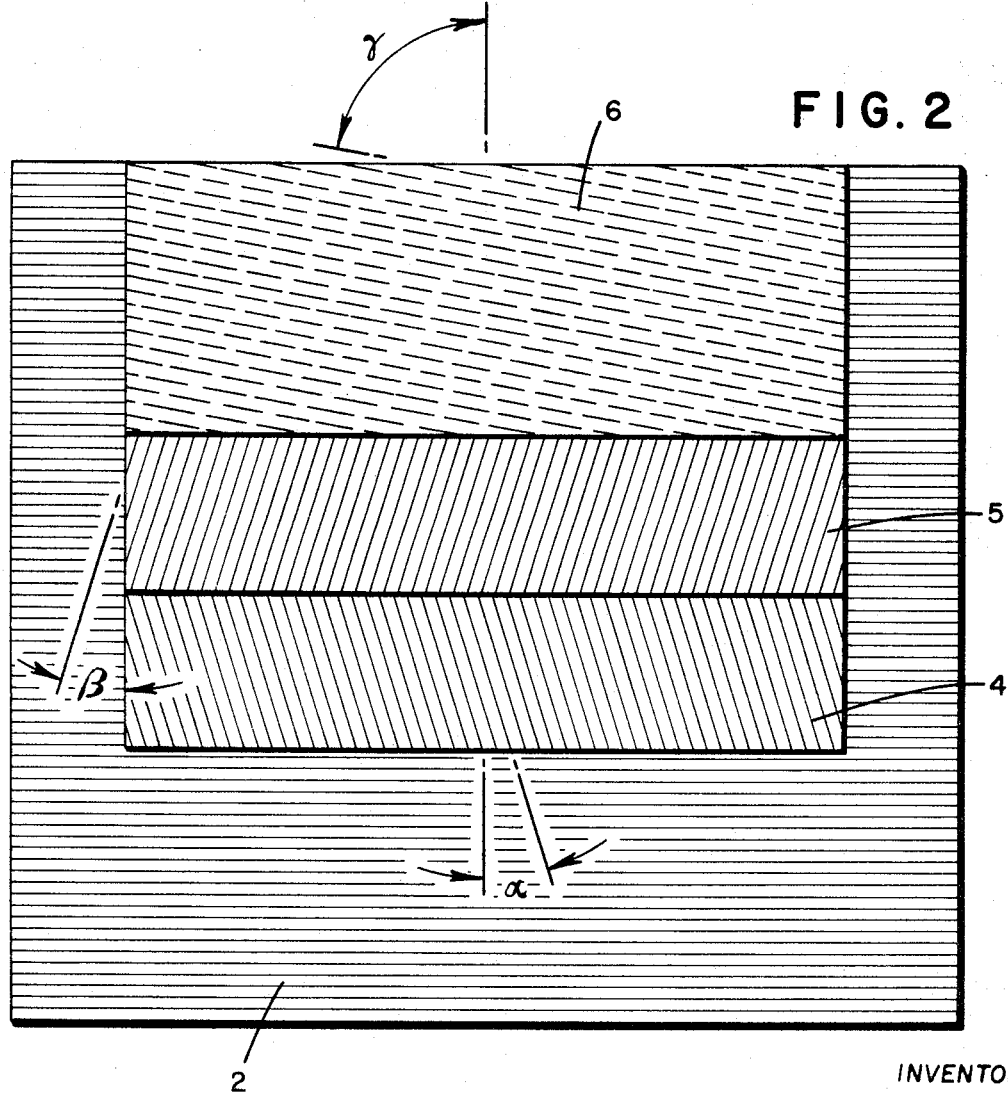
FIG. 2 represents in plan view the breaker structure of the embodiment illustrated in FIG. 1.

FIGS. 1 and 2 illustrate a tire having a tread 1, a carcass 2 formed by cords lying in radial planes and a breaker structure 3, comprising two layers of rayon cords and an additional layer of a reinforced compound interposed between the tread 1 and the carcass 2. In the first layer 4, rayon cords are oriented at an angle $\alpha$ of 18° with respect to the mid-circumferential plane, and in the second layer 5 the rayon cords are oriented at an angle $\beta$ of 18° in a direction opposite to that of the cords of the first layer.

The additional layer 6 is a compound having a thickness of 4 mm and incorporating particles of glass fibers of elongated shape, whose longitudinal axis is oriented at an angle γ of 80° with respect to the mid-circumferential plane of the tire, and is arranged on layer 5. The dimensional characteristics of the particles of glass fibers are described in the aforementioned copending application of the present Applicant. The percentage by weight of said particles is 15 percent on the total weight of the compound forming the additional layer. The width of the rayon layers 4 and 5 and of the additional layer 6 is substantially equal and does not show any particularity, since said layers extend below the tread for a length normally adopted in radial tires.

Figure 3:
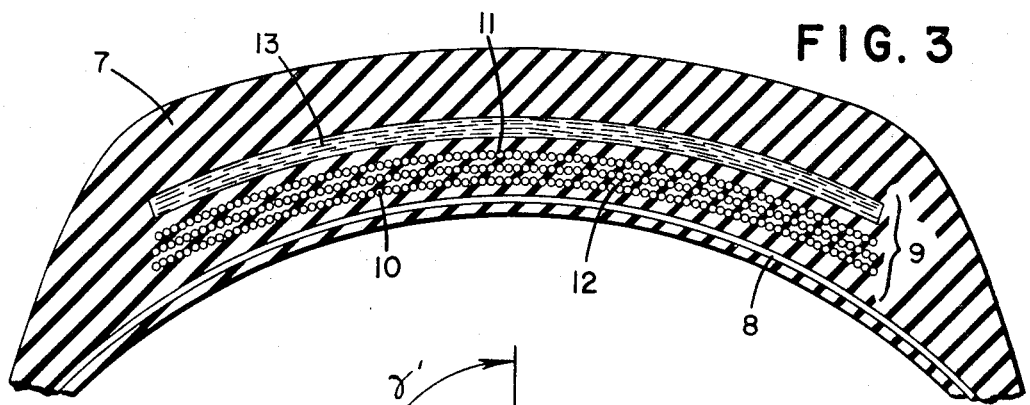
FIG. 3 represents diagramatically in cross-section the tread portion of a pneumatic tire according to another embodiment of the invention.
Figure 4:
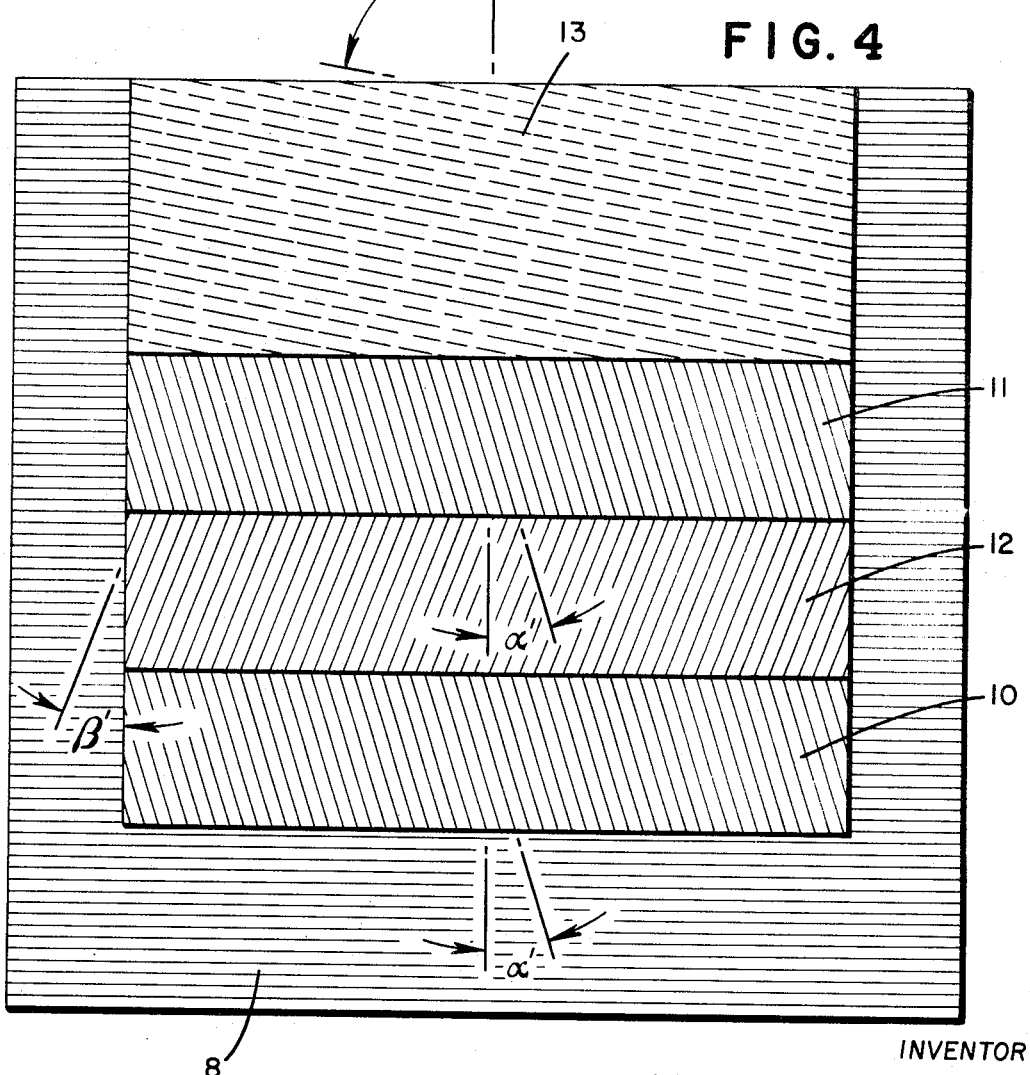
FIG. 4 represents in plan view the breaker structure of the embodiment illustrated in FIG. 3.

FIGS. 3 and 4 illustrate a tire having a tread 7, a carcass 8 formed by cords lying in radial planes and inserted between the tread and the carcass is a breaker structure 9 comprising two layers 10 and 11 of rayon cord, a layer 12 of metallic cords and an additional layer 13 of a reinforced compound. In the two layers 10 and 11, the rayon cords of both layers are oriented in the same direction at an angle α' of 18° with respect to the mid-circumferential plane. In layer 12 the metallic cords are inclined in a direction opposite to that of the rayon cords, at an angle β' of 22' with respect to the mid-circumferential plane. Layer 12 is inserted between layers 10 and 11.

The additional layer 13 is a compound having a thickness of 4 mm and incorporating particles of glass fibers of elongated shape, the longitudinal axes of the particles being oriented at an angle γ' of 80° with respect to the mid-circumferential plane of the tire, and is arranged on layer 11. The dimensional characteristics of the particles of glass fibers are substantially the same as those of the particles employed for the breaker structure of the tire shown in FIGS. 1 and 2. The percentage by weight of said particles in layer 13 is 10 percent of the total weight of the compound of the additional layer.

It is understood that the present invention is not limited to the above illustrative examples, but that it includes any other alternative embodiment deriving from the above indicated inventive principle.

I claim:

1. A pneumatic tire for vehicles which comprises a radial carcass and a breaker structure formed by at least two superimposed layers of cord fabric, said cords being parallel to one another in each layer and being inclined with respect to the mid-circumferential plane in such a way that the direction of the cords in one layer crosses with the direction of the cords of the adjacent layer, the value of the angles formed by the cords of the layers with reference to the mid-circumferential plane of the tire ranging between 10° and 33°, and, in a radially outer position, an additional layer of a compound incorporating particles of glass fibers having a modulus of elasticity of at least 5,000 kg/mm$^2$, the fibers having a length ranging between 0.1 and 1 mm and being of a diameter between 2 and 20 microns, the fibers being present in the compound in a percentage of weight ranging between 3 and 20 percent of the total weight of the compound of said additional layer, the longitudinal axes of said particles being oriented at an angle ranging between 60° and 90° with respect to the mid-circumferential plane of the tire, said additional layer having along the direction of the orientation of the particles resistance to compression greater than that along any other diverging direction.

2. A pneumatic tire as in claim 1 wherein the said longitudinal axes of the particles are oriented at an angle ranging between 75° and 85° with respect to the mid-circumferential plane.

3. The pneumatic tire of claim 1 wherein said additional layer has a width substantially equal to that of the tread.

* * * * *

UNITED STATES PATENT OFFICE
CERTIFICATE OF CORRECTION

Patent No. 3,763,912　　　　　　　Dated October 9, 1973

Inventor(s) Luciano BERGOMI

It is certified that error appears in the above-identified patent and that said Letters Patent are hereby corrected as shown below:

Line [75]
Please note that the single inventor in this patent is --LUCIANO BERGOMI-- and further that "Cinisello Balsamo" refers to the suburb of Milan, in which the inventor resides.

Col. 4, line 10, "thlt" should read --that--.

Signed and sealed this 2nd day of April 1974.

(SEAL)
Attest:

EDWARD M. FLETCHER, JR.　　　　　C. MARSHALL DANN
Attesting Officer　　　　　　　　Commissioner of Patents